March 11, 1924.

W. P. GROVES

NUT LOCK

Filed Feb. 10, 1923

Walter P. Groves.
INVENTOR

BY

ATTORNEY

WITNESS:

Patented Mar. 11, 1924.

1,486,741

UNITED STATES PATENT OFFICE.

WALTER P. GROVES, OF EDWARDSVILLE, KANSAS.

NUT LOCK.

Application filed February 10, 1923. Serial No. 618,413.

*To all whom it may concern:*

Be it known that I, WALTER P. GROVES, a citizen of the United States, residing at Edwardsville, in the county of Wyandotte and State of Kansas, have invented new and useful Improvements in Nut Locks, of which the following is a specification.

This invention relates to nut locks and has for its object the provision of a novel nut and bolt structure provided with means whereby retrograde or unscrewing movement of the bolt or the nut will be positively and absolutely prevented.

An important and more specific object is the provision of a bolt formed with longitudinally extending locking grooves with which co-operates a pivoted pawl carried by the nut and normally held in operative or locking position by means of a leaf spring, the spring being movable to permit swinging of the pawl to its inoperative position when unscrewing of the nut or bolt is desired.

An additional object is the provision of a device of this character which will be simple and inexpensive in manufacture, positive in its holding action, efficient in use, durable in service and a general improvement in the art.

With the above and other objects and advantages in view the invention consists in the details of construction to be hereinafter more fully described and claimed and illustrated in the accompanying drawings, in which:

Figure 2 is an end elevation of the nut showing it engaged upon the bolt,

Figure 3 is a similar view showing the holding spring swung into inoperative position, Figure 4 is a sectional view through the nut showing the lock in its operative position, Figure 5 is a similar view showing the locking member swung into its released position.

Figure 1:
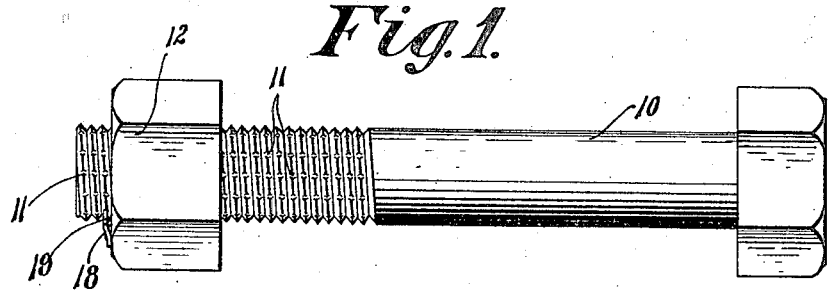
Figure 1 is a side elevation of a bolt equipped with my nut.
Figure 1:
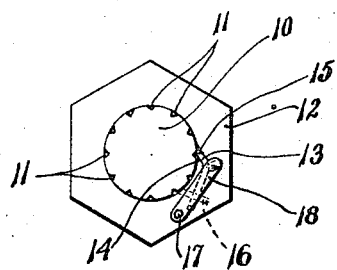
Figure 1:
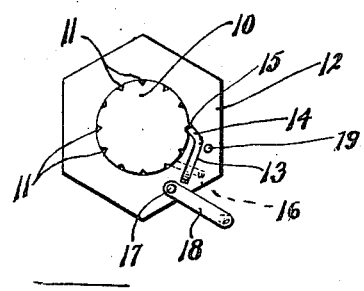
Figure 1:
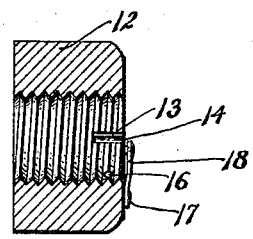
Figure 1:
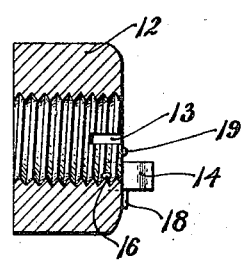

Referring more particularly to the drawings the numeral 10 designates a bolt threaded in the usual manner and formed with a plurality of longitudinal cuts or grooves 11 which are of course transverse with respect to the threads. The numeral 12 designates the nut which is of course threaded on the bolt in the usual manner but which has its outer face formed with an angular recess 13 which has one end communicating with the bore of a nut. Located within this recess is an angular shaped pawl 14 having one end formed with a chiseled edge 15 projecting into the bore of the nut in position to co-operate with the grooves 11 in the bolt. This pawl is pivoted within the recess 13 by means of a pin 16 which is passed from the bore through the outer most end of the pawl as clearly disclosed.

Pivoted at 17 upon the outside face of the nut is a leaf spring 18 which is normally in such position as to engage over the pawl 14 but which is swingable in a plane parallel with the outer face of the nut whereby to disengage the pawl and permit swinging thereof in a plane at right angles to the swinging movement of the spring into inoperative position. The outer face of the nut is provided with a projection 19 which might be integral or added and which is for the purpose of normally holding the spring 18 in its operative position.

In the use of the device it will be seen that when the pawl 14 is in its operative position fitting within the recess 13, and the nut is screwed onto the bolt 10 or vice versa, the chiseled end 15 of the pawl co-operates with the grooves 11 in the bolt for preventing any possible retrograde or unscrewing action of these two elements with respect to each other. When in actual practice it is desired to unscrew the nut or bolt, any suitable tool, such as a screw driver or the like, is inserted beneath the free end of the spring 18 to pry the spring upwardly and over the projection 19 so that the spring may be swung laterally to be disposed in non-obstructing relation to the pawl. The prying implement is then inserted in such a manner as to lift up the free end of the pawl so that the pawl may be swung entirely out of engagement with the bolt. The nut or bolt may then be unscrewed in the usual manner.

From the foregoing description and a study of the drawings it will be apparent that I have thus provided a simply constructed and consequently inexpensive nut and bolt lock which will be very positive in operation and will consequently operate to prevent any unscrewing and consequent loss of the nut, the device being of course particularly advantageous for use on railroads and other places where it is highly desirable that a positive or absolute holding action be maintained. The lock has the additional advantage of being capable of being thrown into inoperative position whenever such is desired.

While I have shown and described the preferred embodiment of the invention it is of course to be understood that I reserve the right to make such changes in the form, construction and arrangement of parts as will not depart from the spirit of the invention or the scope of the subjoined claims.

I claim:

1. In combination, a bolt provided with a plurality of longitudinally extending grooves, a nut threaded onto the bolt and having its outer face formed with a recess, a pawl pivoted at one end within said recess and having a chisel point engaging the periphery of the bolt, said pawl being swingable in a plane at right angles to the face of the nut, and a leaf spring pivoted at one end upon the face of the nut and swingable in substantially the same plane with the face of the nut whereby to be selectively engaged upon or disengaged from the pawl, said spring normally operating to hold the spring within the recess, and means for preventing the spring from moving casually out of engagement with the pawl.

2. In combination, a bolt provided with a plurality of longitudinally extending grooves, a nut threaded onto the bolt and having its outer face formed with an angular recess, an angularly shaped pawl pivoted at one end within said recess and having a chisel point engaging the periphery of the bolt, and spring means for holding said pawl within said recess, consisting of a leaf spring pivoted upon the outer face of the nut and normally engaging upon the pawl, the outer face of the nut being formed with a projection normally preventing movement of said spring out of engagement with the pawl, said spring being capable of being pried away from the nut and swung over the projection into non-obstructing relation to the pawl, and the pawl being swingable in a plane at right angles to the plane of the outer face of the nut whereby to disengage the bolt.

In testimony whereof I affix my signature.

WALTER P. GROVES.